US006597684B1

United States Patent
Gulati et al.

(10) Patent No.: US 6,597,684 B1
(45) Date of Patent: Jul. 22, 2003

(54) DISTRIBUTED ARCHITECTURE AND ASSOCIATED PROTOCOLS FOR EFFICIENT QUALITY OF SERVICE-BASED ROUTE COMPUTATION

(75) Inventors: Neeraj Gulati, Santa Clara, CA (US); Zafar Ali, Kanata (CA); Saman A. Rabie, Kanata (CA); Ling-Yue Hung, Nepean (CA)

(73) Assignee: Nortel Networks Ltd. (CA)

( * ) Notice: Subject to any disclaimer, the term of this patent is extended or adjusted under 35 U.S.C. 154(b) by 0 days.

(21) Appl. No.: 08/998,223

(22) Filed: Dec. 24, 1997

(51) Int. Cl.$^7$ ............................................. H04L 12/28
(52) U.S. Cl. ...................................... 370/351; 370/400
(58) Field of Search ............................... 370/254, 255, 370/351, 400, 401, 410

(56) References Cited

U.S. PATENT DOCUMENTS

| | | | | |
|---|---|---|---|---|
| 5,222,242 A | * | 6/1993 | Choi et al. | 395/800 |
| 5,289,462 A | * | 2/1994 | Ahmadi et al. | 370/60.1 |
| 5,485,455 A | * | 1/1996 | Dobbins et al. | 370/60 |
| 5,528,592 A | * | 6/1996 | Schibler et al. | 370/60.1 |
| 5,649,108 A | * | 7/1997 | Spiegel et al. | 395/200.12 |
| 5,825,772 A | * | 10/1998 | Dobbins et al. | 370/396 |
| 5,933,425 A | * | 8/1999 | Iwata | 370/351 |
| 5,953,316 A | * | 9/1999 | Lazar et al. | 370/230 |
| 5,999,525 A | * | 12/1999 | Krishnaswamy et al. | 370/352 |
| 6,016,319 A | * | 1/2000 | Kshirsagar et al. | 370/410 |

OTHER PUBLICATIONS

IBM Corp., "Chapter 5. Private Network–To–Network (Node–to–Node) Interface—PNNI," pp. 5–1 to 5–7, 1995.

* cited by examiner

Primary Examiner—Dang Ton
Assistant Examiner—Toan Nguyen
(74) Attorney, Agent, or Firm—Steubing McGuinness & Manaras LLP

(57) ABSTRACT

In a packet switching network, a distributed architecture provides efficient computation of routes in Quality of Service (QoS)-based routing scenarios. Using a client-server model, only designated route servers store and maintain a database containing the entire network topology, so that each network node is not required to store and maintain the network topology. Client nodes maintain a cache containing pre-computed routes so that they can often make routing decisions autonomously. A client contacts a designated route server only when the client cannot obtain from its local cache a route to a given destination that meets the performance requirements. A client cache may contain pre-computed routes with designated QoS profiles to all destinations or to a subset of destinations. Route servers may also contain caches, which may contain pre-computed routes to all destinations in the network with all QoS profiles, or may contain only a subset of such routes.

Each client node may also be provided with intelligence to learn, maintain and adapt local information based on the statistical usage of the network. Client caches may learn statically, i.e, the cache contains routes based on a QoS profile provided by the network service provider, or they may learn dynamically, i.e., routes are modified based on ongoing network usage statistics. The goal is to minimize the need to contact the route server as much as possible. Protocols are defined to maintain synchronization between the route server and its clients distributed across the network. These protocols need to be observed to ensure that all nodes have the latest view of the network topology stored at the route server.

18 Claims, 5 Drawing Sheets

DISTRIBUTED ARCHITECTURE AND ASSOCIATED PROTOCOLS FOR EFFICIENT QUALITY OF SERVICE-BASED ROUTE COMPUTATION

BACKGROUND OF THE INVENTION

The present invention relates to the field of packet switching networks, e.g., Asynchronous Transfer Mode (ATM) networks. Specifically, the invention relates to a distributed architecture and associated protocols for computing resource-sufficient routes capable of meeting a requested Quality of Service (QoS) level. The disclosed methodologies are equally applicable to connection-oriented networks observing QoS-based source routing and connectionless networks supporting multiple QoS levels.

Real-time multi-media applications demand explicit QoS guarantees from the underlying network. To guarantee a given QoS level in the network, switching nodes or routers implement a QoS-based routing system that can observe explicit resource reservation. Such a system endeavors to find cost-effective resource-sufficient routes.

A QoS-based routing system requires network nodes to gather and maintain network topology as well as resource availability information. FIG. 1 shows such a network indicated generally by reference numeral 10. Network nodes 12, 14, and 16, which are routers or switches, exchange information about their internal resource availability including nodal-characteristics, link-attributes, and end-system reachability information, etc. Databases 18, 20, and 22, connected to nodes 12, 14, and 16, respectively, store such network topology and resource availability information. A source node uses the network topology and resource availability information to compute resource-sufficient routes to the destination node that can support the desired QoS.

As the network grows, there are corresponding increases in the size of the topology database, the time required to determine a route, and the network control traffic overhead. The network scalability problem associated with QoS routing has been addressed by the concept of hierarchical routing. A hierarchical routing system divides the network into logical groups. Only nodes that belong to the same logical group exchange detailed topology and link state information with each other. A node outside the group only stores aggregate information about the group.

To further scale down routing overhead requirements as the network grows, resource availability information is exchanged only periodically (e.g., every several minutes) or at the occurrence of a significant change in resource availability (e.g., link/node failures, link utilization exceeding the 90% mark, etc.). Because resource availability information may be outdated, an intermediate node may reject a call setup request. In this case, the call retraces its path to the originating node, which then tries an alternate route.

Even in hierarchical networks, route computation requires considerable processing to find a cost-effective and resource-sufficient path that can meet the requested QoS level. First, the route computation engine at a node needs to perform a topology search to find a low cost path while ensuring that each link (physical or logical) in the path has the resources to accept the connection. In addition, topology database maintenance imposes considerable processing and storage requirements on switching nodes. Nevertheless, currently implemented QoS-based and best effort routing networks require each node to compute routes, store and maintain a topology database, and participate in the topology update process. The proposed architecture is tailored to distribute processing and memory requirements to support both QoS-based and best effort routing.

A client-server architecture, in which a server stores all topology information and performs all route computation, would alleviate the processing and storage requirements of each node. FIG. 2 shows a centralized client-server network, indicated generally by reference numeral 22, for implementing route computation. Under this approach, single route server 24 stores all network topology and resource availability information in associated database 26. Clients 28, 30, and 32 store no topology or routing information locally and therefore must communicate with server 24 every time they need to make routing decisions. Although the architecture in FIG. 2 removes the processing and storage requirements at each node as shown in FIG. 1, network congestion still occurs as each client node must contact the server to make routing decisions. Also, limited processing power at the server may impede fast computation of routes and communication of those routes back to the client nodes.

It is desirable, therefore, to provide a distributed architecture that makes intelligent use of processing elements distributed across the network to enhance performance of a routing system. Current QoS-based routing standards (e.g., Private Network to Network Interface (PNNI) defined by the ATM Forum) do not address route computation methods. Earlier proposed route caching methods (e.g., routing in an Internet Protocol (UP) network), which store some route information locally, apply only to connectionless routing with no QoS guarantees. Cache tables in such schemes do not guarantee that the selected hop satisfies the requested QoS requirement. It is even more desirable, therefore, to provide a client-server architecture for determining routes from a source node to a destination address or node that can provide QoS guarantees along the route.

The problem of route caching is more acute for networks that provide QoS guarantees because, in such an environment, the memory required to store cached routes may be prohibitively large. For example, in a connection-oriented network observing QoS-based source routing, a cached route entry contains an entire description of an end-to-end path to a given destination for a given QoS level. On the other hand, a route that can satisfy a given QoS level may not be able to meet another QoS requirement, and a source, therefore, may be required to store multiple QoS-based routes to the same destination. Similarly, a connectionless network may be designed to store information for the next hop, or route, for various QoS levels. Furthermore, with dynamically changing resource availability inside the network, an end-to-end route description or the next hop route entry for a given QoS profile may not be valid after some time. Therefore, the cached routes need to be updated to ensure their validity.

Earlier proposed client-server approaches to assist QoS-based routing (e.g., Multiprotocol over ATM (MPOA), LAN Emulation (LANE), and Multicast Address Resolution Server (MARS) protocols) only perform address resolution and do not address distributed route computation methods. It is also desirable, therefore, to provide a distributed route computation methodology to complement these client-server architectures. Further, there has been no effort to make use of distributed processing techniques to optimize performance of a QoS-based routing system and enhance network scalability in such an environment. To further improve performance, it is also desirable to eliminate the need for every node in the network to participate in the topology exchange process and store network topology.

SUMMARY OF THE INVENTION

This invention satisfies those desires by providing a distributed client-server architecture that allows fast access to routing information. Route servers, distributed across the network, store and maintain a network topology database. Client nodes store pre-computed routes locally and access route servers only when unable to obtain routing information locally. The present invention provides performance gains and enhances scalability in QoS-based networks observing source-based routing such as PNNI, MPOA, and LANE networks.

A method consistent with the present invention comprises the steps of searching a route cache at a source node for a route satisfying a QoS profile and obtaining a route from a route server if no route is found in the route cache. The method further comprises the step of updating the contents of the route cache based on network usage or changes in the state of the network. Another method consistent with the present invention also comprises the step of populating the route cache with a plurality of pre-computed routes. Yet another method consistent with the present invention comprises the steps of searching a route cache at a source node for a route satisfying a QoS profile, searching a route cache at a route server for a route if no route is found in the source route cache, and computing a route at the route server if no route is found in the server route cache.

Apparatus and networks are also provided for carrying out methods consistent with the present invention.

The advantages accruing to the present invention are numerous. For example, rather than storing all topology information on a centralized server, the inventive architecture provides a subset of routing information at client nodes, so that a client node does not have to contact the route server on every call request. A client node needs to contact a route server only when information is not available locally. Further, each individual client node has the intelligence to learn, maintain, and adapt local information based on the statistical usage of the network, minimizing as much as possible the need to contact the route server. Advantageously, clients autonomously decide which subset of information to store locally. Finally, the invention provides protocols for synchronizing client information and the topology database stored at the route server.

The above desires, other desires, features, and advantages of the present invention will be readily appreciated by one of ordinary skill in the art from the following detailed description of the preferred implementations when taken in connection with the accompanying drawings. Both the foregoing general description and the following detailed description are exemplary and explanatory only and do not restrict the claimed invention. The accompanying drawings, which are incorporated in and constitute a part of this specification, illustrate several embodiments of the invention and together with the description serve to explain the principles of the invention.

DETAILED DESCRIPTION OF THE PREFERRED EMBODIMENTS

Figure 1:
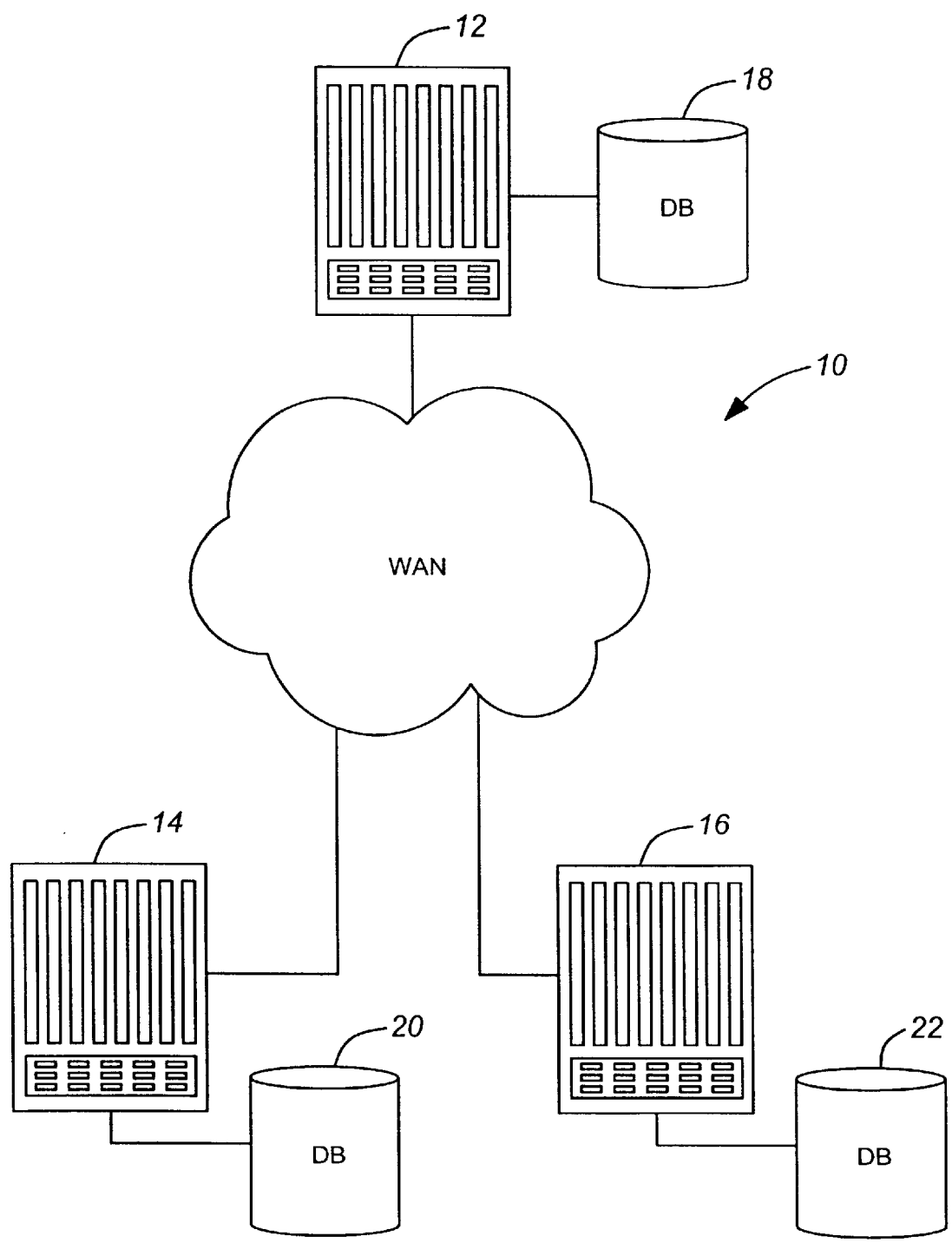
FIG. 1 is a high level diagram of a fully distributed routing scheme known in the art.
Figure 2:
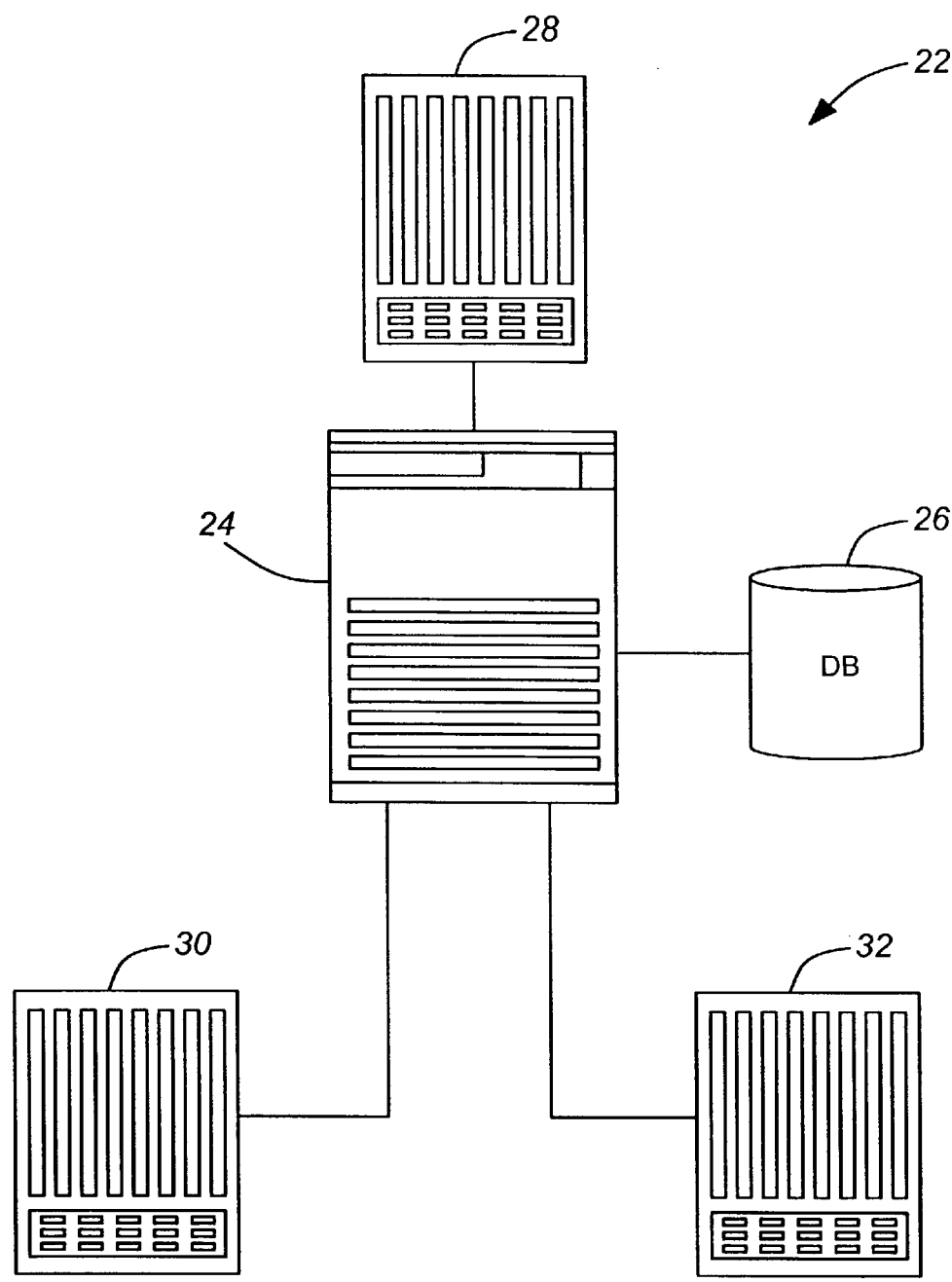
FIG. 2 is a high level diagram of a prior art centralized architecture for route computation.
Figure 3:
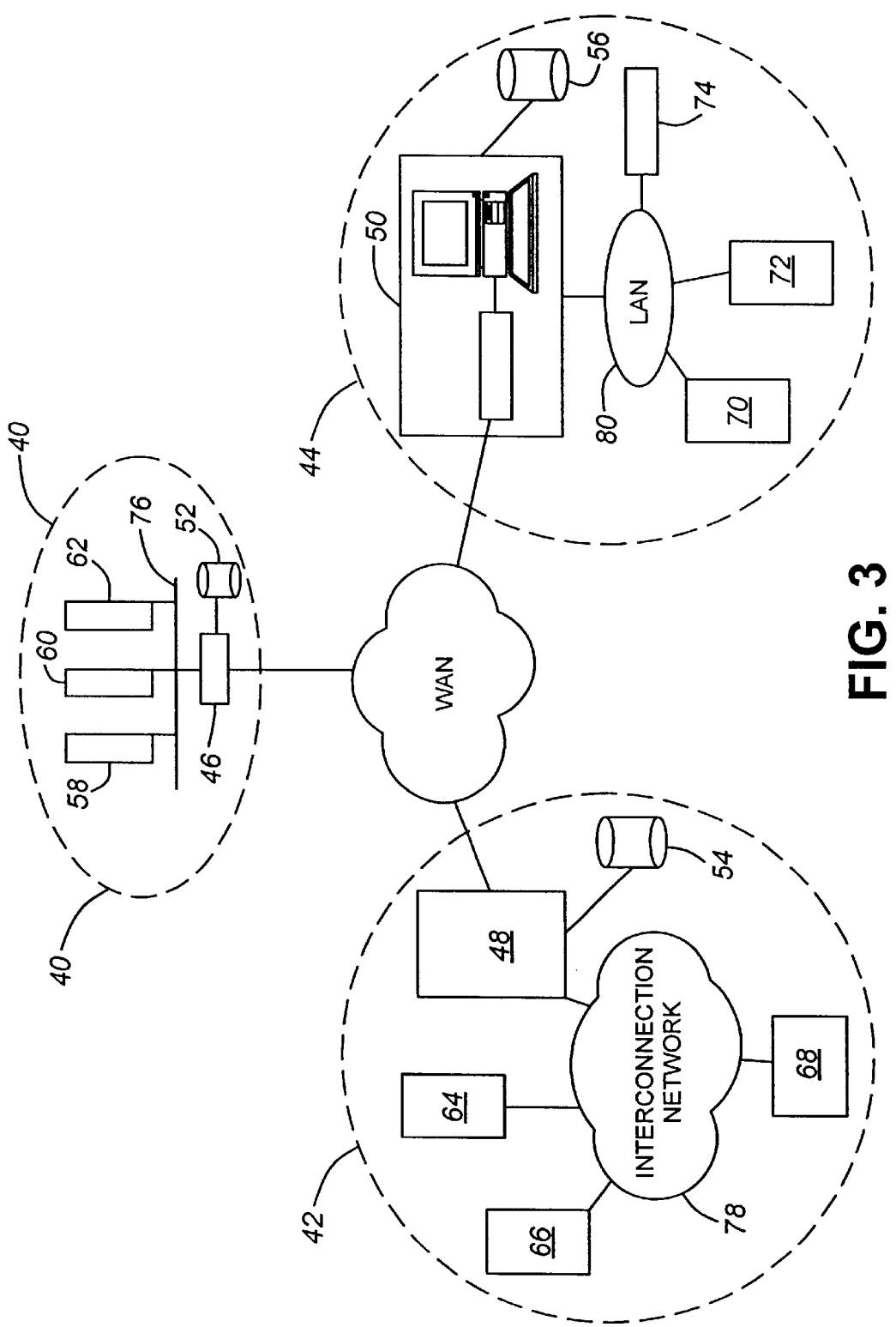
FIG. 3 illustrates a networking scenario with distributed route caching consistent with the present invention.

FIG. 3 illustrates a network architecture consistent with the present invention in which network topology databases are maintained and stored only at selected route servers distributed across the network. For this purpose, the whole network is divided into clusters called routing tiers, three of which—tiers 40, 42, and 44—are shown for purposes of this discussion. Each routing tier 40, 42, and 44 includes a route server—46, 48, and 50, respectively—that services a group of clients distributed across an interconnection network. By way of example, route server 46 services clients 58, 60, and 62, route server 48 services clients 64, 66, and 68, and route server 50 services clients 70, 72, and 74. Within the routing tiers, only the route servers store and maintain the entire network topology, which is stored, for example, in databases 52, 54, and 56. When the network updates the topology databases, each server communicates with other servers to transfer information pertaining to its clients. Client nodes do not maintain their own copies of the topology database. As will be described in more detail below, client nodes maintain local caches, not particularly shown in FIG. 3, to store pre-computed routes. Clients access servers to obtain route information only when pre-computed information is not available at the client's local cache.

Route servers 46, 48, and 50 may be either network nodes, such as routers or switches, or separate processors which are not part of the network. The clients, on the other hand, may be physical switches or routers or processor elements within a distributed switching system. In a distributed route caching architecture consistent with the present invention, each client communicates with its server via an interconnection network. The interconnection network can take many forms. With continuing reference to FIG. 3, one such interconnection network is shared bus 76, connecting clients 58, 60, and 62 to route server 46. Shared bus 76 may connect nodes within the same physical location or may operate on the backplane of a distributed switching system. A second type of interconnection network is a Local Area Network (LAN) such as an Ethernet network, an FDDI network, or a token ring network. For example, in FIG. 3, LAN 80 interconnects client nodes 70, 72, and 74 with route server 50. A third interconnection network, Wide Area Network (WAN) 78, interconnects client nodes 64, 66, and 68 with route server 48. A distributed network caching methodology consistent with the present invention is not limited to a specific networking scenario or type of interconnection network, and the interconnection networks illustrated in FIG. 3 are exemplary only.

When a network node receives a call setup request, it attempts to find the best route to the specified destination address or destination node. The selected route must meet the bandwidth requirements of the call as well as the required QoS level. Routes are usually optimized based on user-specified criteria, e.g., Administrative Weight (AW), end-to-end delay, and end-to-end delay variation, either alone or in combination.

A distributed network routing methodology consistent with the present invention selects optimal routes without duplicating the entire topology database at each individual network node. Instead, each node contains a cache for storing a set of pre-computed routes. These routes are classified with respect to their destination addresses or nodes, bandwidth requirement, Virtual Private Network Identifier, QoS level (e.g., end-to-end delay requirement, delay variance constraints, and cell loss ratio requirement), and service category (e.g., real-time or best effort, continuous bit rate or variable bit rate). These route attributes used for route classification are collectively referred to herein as the QoS profile. When a source node receives a call destined for an address or node for which a suitable route meeting the desired QoS profile is available in the cache, the node forwards the call along the route retrieved from the cache. If the client node cannot find a suitable route in the cache, the client node solicits the route server to obtain a route to the desired destination.

A route caching methodology consistent with the present invention reduces latency in route selection by providing from the cache a suitable route for an incoming call setup request. The number of pre-computed routes that can be stored in the cache is limited by the amount of memory that can be dedicated to route caching at a single node. Furthermore, the pre-computed cached routes must be based on the latest view of the network topology stored at the route server. These constraints must be considered in determining the contents of each client node's cache.

The following equation is useful in analyzing the dynamic of a distributed architecture consistent with the present invention:

$$\text{Mean Route Access Time} = A*h + B(1-h). \quad (1)$$

In equation (1), A represents the average time required to find a suitable route in the client node's local cache, B represents the average time to fetch a route from the route server when the client node cannot find a route locally, and h represents the cache hit rate, defined as the fraction of requests for which the client node can find a cached route. When the client node must contact the route server to obtain a route, the route server may have to perform route computation on demand, so that generally B is significantly greater than A.

Therefore, one objective of a distributed route caching scheme consistent with the present invention is to maximize h at each node. The hit rate is maximized by caching a network corridor map at the client node, where the network corridor map is a table containing routes from the client (source) node to every possible destination address for a given QoS profile. Caching network corridor maps for multiple QoS profiles increases the hit rate further. A distributed route caching scheme consistent with the present invention allows network service providers to define QoS profiles for which routes should be cached based on their past experience with operating the network.

While distributed route caching methodologies consistent with the present invention strive to maximize the hit rate, h, the memory constraints of storing pre-computed routes at the individual clients is also considered. Depending on the size of the network and the amount of cache memory available at a client node, it may not be feasible to cache a QoS-based route to every destination of local interest. When limited cache memory is available, clients cache only routes to a subset of destinations of local interest with the QoS profiles of local interest. For purposes of further discussion, a client node will be referred to herein as fully cached if the client caches QoS-based routes to all destinations of local interest with all the QoS profiles of local interest. A client node will be referred to herein as partially cached if the client caches routes only to a subset of network destinations of local interest. Distributed route caching methodologies consistent with the present invention allow network service providers to define the destinations and QoS profiles of local interest.

In a distributed route caching methodology consistent with the present invention, there are at least two alternatives for establishing the locality of interest at each client node: (1) static learning, in which each client uses the locality of interest defined by the network service provider and does not modify the local interest based on network usage; and (2) dynamic learning, in which each client uses the locality of interest defined by the network service provider to populate the cache initially, but modifies the destinations and QoS profiles of local interest based on network usage. With dynamic learning, the localities of interest of the client nodes may vary temporally (e.g., by time of the day or day of week) as well as spatially (i.e., various nodes may commonly request calls to different sets of nodes or addresses in the network). Route caching consistent with the present invention exploits each node's pattern of past temporal and spatial behavior to determine a locality of interest for the node at any point in time. By utilizing past behavior, each node predicts which routes it is likely to need in the near future and stores these routes in its cache.

The performance of distributed route caching schemes consistent with the present invention can be further maximized by reducing the latency, B, to fetch a route from the route server when the client node cannot find a route locally. For this purpose, in addition to maintaining local caches at the client nodes, a distributed architecture consistent with the present invention may maintain a cache at the server node as well. The cache at the server complements the cache information provided to the individual clients. For example, the individual clients may observe partial caching only for routes of local interest, while the server may use a full cache which contains routes to all destinations with all QoS profiles supported by the network service provider.

A fll cache at the server consistent with the present invention caches network corridor maps with all QoS profiles supported by the network service provider. On the other hand, a fully cached client stores only routes to destinations of local interest for the QoS profiles of local interest. Therefore, distributed route caching methodologies consistent with the present invention may operate in at least one of four scenarios: (1) full caching at both the server and clients, and (2) fall caching at the server and partial caching at the clients, (3) full caching at the clients and partial caching at the server, and (4) partial caching at both the server and clients.

Thus, an architecture and methodology consistent with the present invention determine the locality of interest of each client node, manage the limited cache space to suit the local interest, and synchronize the cache with the latest view of the topology database so that pre-computed routes remain valid.

Figure 4:
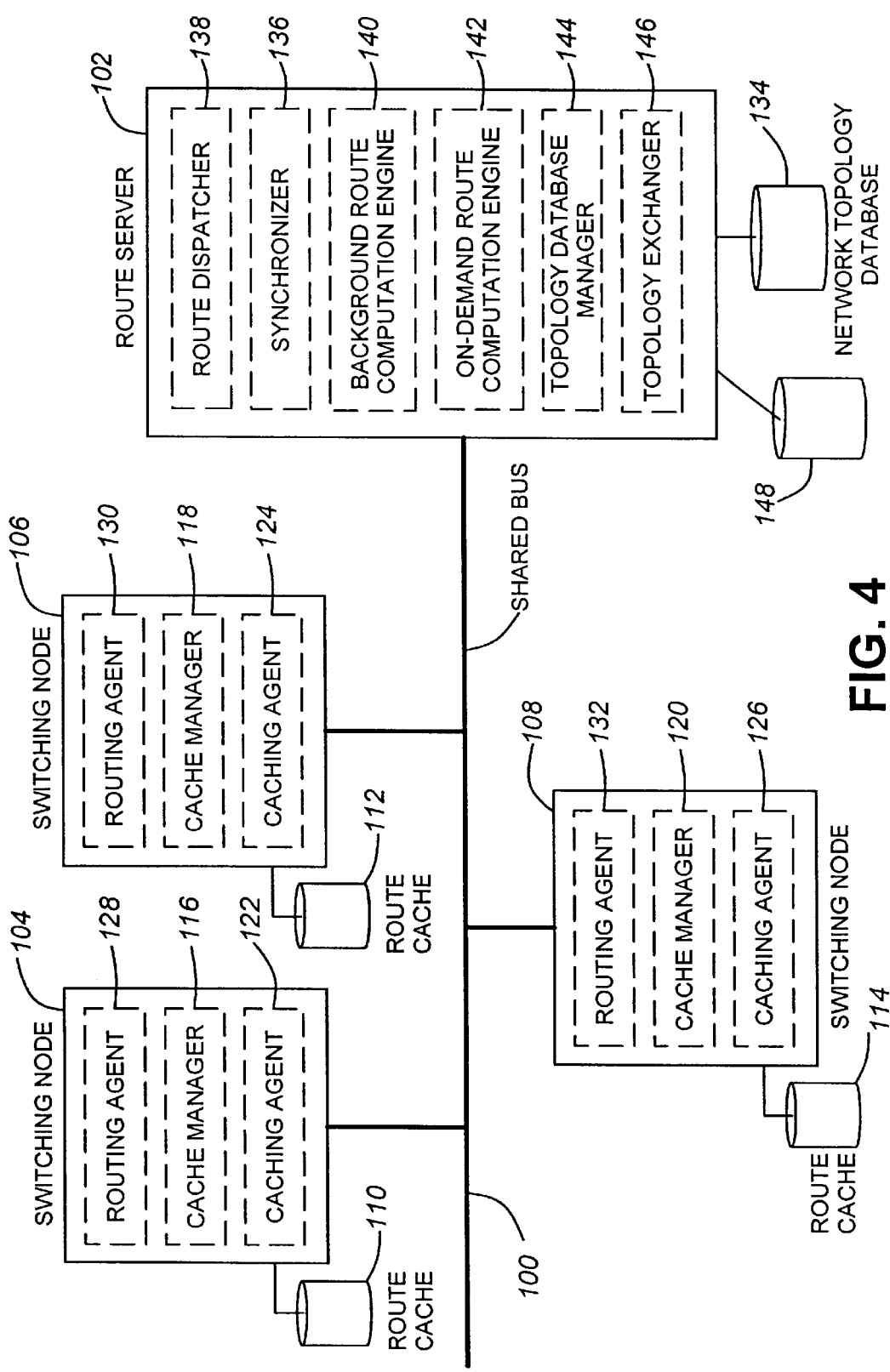
FIG. 4 illustrates an implementation of distributed route computation consistent with the present invention.

By way of example only, FIG. 4 details a specific software implementation of a distributed architecture consistent with the present invention. However, one skilled in the art will appreciate that there exist several implementations consistent with the present invention, and the invention is not limited to the specific implementation shown. Shared bus 100 interconnects route server 102 with client switching nodes 104, 106, and 108, all of which operate within one routing tier. Alternatively, the shared bus may be another type of interconnection network, e.g., a LAN or WAN as discussed in connection with FIG. 3. The client switching nodes may also be routers, and route server 102 may be an additional switching node or may be a separate processor which does not route or switch traffic. Each switching node 104, 106, and 108 contains a route cache for storing pre-computed routes 110, 112, and 114, respectively, a cache manager 116, 118, and 120, respectively, a caching agent 122, 124, and 126, respectively, and a routing agent 128, 130, and 132, respectively. Route server 102 includes network topology database 134, synchronizer 136, route dispatcher 138, background route computation engine 140, on-demand route computation engine 142, topology database manager 144, topology exchanger 146, and route cache 148.

Cache managers 116, 118, and 120 may be software entities resident on each node. Each cache manager controls the usage of local memory available for route caching by using one or more of the following functions: (1) learning, i.e., determining the population of the cache at start-up and which new routes should be added on an ongoing basis; (2) route replacement, i.e., determining which route entry should be removed from the cache when the cache is full and a new route entry must be added; and (3) route purging, i.e., determining when and why entries should be removed, separate from the route replacement function. A client node can perform these operations at a low priority, e.g., the client may accumulate multiple caching requests and bundle them together in a single message to the route server.

Each cache manager determines the population of the cache using prior knowledge of the usage pattern of calls originating from the client node. The network service provider defines an initial QoS profile for each client node, characterized by the destination address, service category, bandwidth requirement, and required QoS level, or some subset thereof. The cache manager may use the initial QoS profile to populate the cache with pre-computed routes.

The cache manager may increase its knowledge of the node's locality of interest on an ongoing basis by tracking the call setup requests the node receives. When the client obtains a route from the server because its route cache contains no routes meeting the requested QoS profile and optimization criteria, the cache manager places the newly obtained route in its cache. Similarly, the cache manager updates the route cache as a result of crankback, a PNNI feature known in the art that enables a blocked call setup request to return to the source or an earlier intermediate node in its path, which attempts to reroute the call. When a node learns that a call setup has failed for a route previously selected by the node, the node informs its cache manager to invalidate the route. If the node then obtains a new route from the server, the cache manager replaces the new route in the cache in place of the old, invalid route.

When the cache manager learns about a new QoS profile and attempts to add it to the client's route cache, the cache manager may remove an entry to free memory for the newly learned route. There are several approaches a cache manager consistent with the present invention may take, alone or in combination, in deciding which entry to replace. According to one approach, the cache manager maintains records of the last time an entry in the cache has been hit, i.e., the last time the client node selected the entry as an optimal route. With this method, the cache manager replaces the entry which has not been hit for the longest period of time. According to another approach, the cache manager maintains a count of the number of times an entry has been hit, i.e., the number of times the cache manager has selected the entry as an optimal route. With this method, the cache manager replaces the entry that has received the smallest number of hits. According to yet a third approach, the cache manager maintains both a count of the number of hits and the time elapsed since the last hit. The cache manager then weights the count of hits by the time elapsed since each hit so that the weight of a particular hit on an entry decreases with time. In one implementation of this weighted approach, an entry in the route cache has a holding priority $H_k$ during the kth time interval represented by:

$$H_k = w \cdot H_{k-1} + (1-w) U_{k-1},\qquad(2)$$

where $U_{k-1}$ is the number of hits the given route received during the (k−1)st interval, and the weight w is a number such that $0 <= w <= 1$. If the cache manager must make a replacement decision during the time period p, the cache manager replaces the entry with the lowest $H_p$ value. If two or more entries share the lowest value, the cache manager selects an entry to be replaced using some criteria, e.g., by randomly selecting one of the candidate entries.

Even when the cache manager does not need to remove entries from the cache because the cache is underutilized, it may be desirable to purge any cached routes that have remained in the cache for a significant period of time. Similarly, when a route suffers a crankback, it may be purged.

Consistent with the present invention, the client node may purge routes autonomously or with assistance from the route server, as will be described below. In one approach to autonomous purging, the client node places an upper limit on the lifetime of a cached route, regardless of how often the node obtains the route directly from the route cache. Upon expiration of the route lifetime, the cache manager purges the route from the cache. A purged route may be automatically fetched again from the route server if certain criteria are met, e.g., if the purged route was popular in the recent past, as measured by comparing its hit rate to a predefined hit rate threshold.

With continuing reference to FIG. 4, caching agents 122, 124, and 126 may be software entities resident on each client node. Each caching agent stores, removes, and retrieves cached routes on a demand basis. Each caching agent is optimized for efficient retrieval of the cached routes based on the destination address, QoS profile, and optimization criteria. For example, each caching agent may use a data structure that can efficiently search the cache to find a route that satisfies the QoS requirements and optimization criteria to a given destination. In addition to matching QoS profiles with routes in the local route cache, the caching agent may implement some additional functions. For example, if for a given destination address and QoS profile there are multiple routes available in the cache, the caching agent may achieve load balancing by using a technique such as weighted round robin to select one route over others based on certain criteria. Another function of the caching agent is to determine whether to use a cached route whose QoS profile surpasses that of the call request in order to avoid contacting the route server to obtain a route. For example, the caching agent may decide to use a cached route capable of supporting 2 Mbps bandwidth even though the connection requires only 1.5 Mbps bandwidth.

Routing agents 128, 130, and 132 are software modules on each node that interpret a call request to extract the destination address or node and QoS profile. Based on this information, a routing agent prepares a route request message for the caching agent. If a route cannot be obtained from the cache, the routing agent solicits the route server for a suitable route. When the routing agent obtains a route from the route server, the routing agent informs the cache manager so that the cache manager can learn the new route and add it to the client node's route cache.

Synchronizer 136 in route server 102 maintains synchronization of network topology database 134 and route caches 110, 112, and 114 at the client nodes. For this purpose, the synchronizer tracks usage of routes by the distributed clients. If the client nodes implement autonomous purging, then, consistent with the present invention, route server 102 tracks route usage by remembering, for a period of time equal to the lifetime of the route before purging occurs, that a particular client node has stored a route in its route cache. If the route undergoes a change before the route lifetime expires (e.g., if a node becomes inactive and must be removed from all routes, or if cached routes become invalid as a result of a resource availability update or crankback and no longer satisfy the required QoS profile), the route server informs the client of the change, instructs the client to purge the route, and discontinues updates for that route to the client. If the client determines that it should continue to store the route in its route cache, it fetches the route again from the route server. Alternatively, instead of instructing the client to purge the route, the route server can provide the client with the newly computed route, which would remain in the client's route cache for the lifetime of the route. In either case, once the route lifetime has expired, the route server assumes that the client has already purged the route, and discontinues updates pertaining to that route. If the client has already purged or replaced the route before the route lifetime has expired, the client will ignore the route server's updates. This overall approach, in which the route server remembers which routes are stored in each client's route cache, ensures that locally stored routes are always synchronized with the route server's view of the network, as stored in its network topology database.

In a second method for tracking route usage consistent with the present invention, the client does not perform autonomous purging of routes from its route cache. Instead, the client depends on the route server to track the routes stored in the local route cache and to refresh them periodically. The route server maintains its knowledge of routes in the local route caches either by periodically probing the clients or by being informed by the clients when an existing route is replaced. Under the first scenario, there may be a period of time between probes during which the local caches may not be synchronized with the route server. Under the second scenario, however, the local caches are synchronized with the route server's topology database. The second approach, however, requires more processing by both the client node and the route server.

When a client node cannot find a route in its route cache that satisfies a given call setup request, the routing agent of the client contacts the route server to obtain a route. Route server 102 receives all routing requests through route dispatcher 138, which is responsible for instructing route computation engines 140 and 142 to compute routes in the background or on demand, respectively. Background route computation engine 140 typically computes network corridor maps or routes currently cached by the client nodes to populate individual clients on a periodic basis. On-demand route computation engine 142 typically computes a route when a client cannot find a route locally and contacts the route server to obtain a route.

When route dispatcher 138 receives a request for a route, it forwards this request to on-demand route computation agent 142. Alternatively, if route server 102 also maintains its own route cache of pre-computed routes, as illustrated by route cache 148 in FIG. 4, route dispatcher 138 may search the server's route cache before soliciting an on-demand route computation. Maintaining independent cache 148 at the server is advantageous when the client nodes have limited memory and/or the server has a large memory space for route caching. With its own route cache, the server may store network corridor maps containing optimal routes to all destinations with several QoS profiles to avoid on-demand path computation as much as possible. Server route cache 148 is maintained in the same manner as other caches in the system. Whether route dispatcher 138 obtains a route from a computation engine or the server's route cache, it returns to the client a cost-effective and resource-sufficient route to the given destination.

Topology database manager 144, shown in FIG. 4, maintains network topology database 134 stored at route server 102 and receives updates from topology exchanger 146. Route servers across a network exchange information through topology exchanger entities, which typically participate in the topology update process on behalf of the clients in its routing tier. This architecture reduces the processing needed at client nodes by removing them from the topology update process.

Figure 5A:
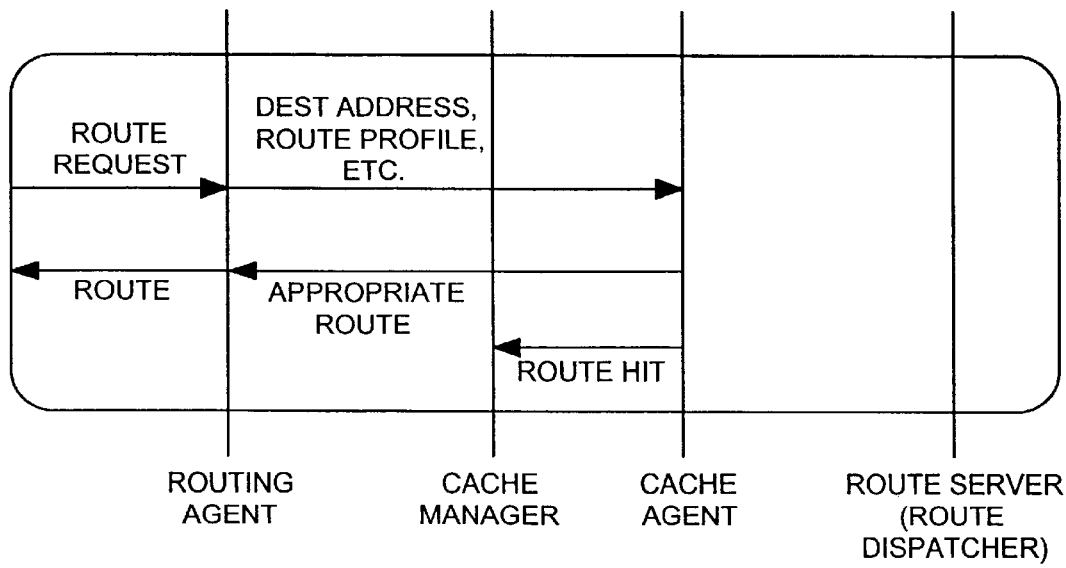
FIGS. 5A–B illustrate the operation of a protocol for distributed route computation consistent with the present invention.
Figure 5B:
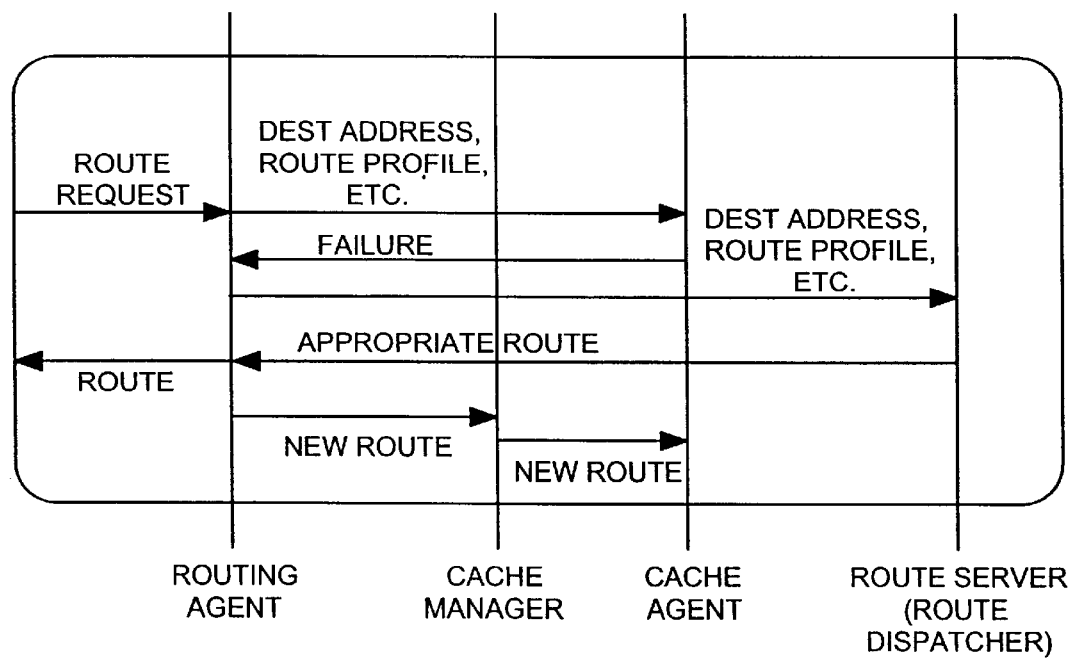

FIGS. 5A–B illustrate the operation of a distributed route computation protocol consistent with the present invention under two scenarios. In FIG. 5A, the desired route is obtained from the local cache, and in FIG. 5B, a desired route is not available in the local cache. In FIG. 5A, the client node receives a route request at its routing agent. The routing agent then prepares a route request for the caching agent, including the destination address, QoS profile, and optimization criteria. The caching agent retrieves a suitable route from the local route cache and informs the cache manager of the route hit so that the cache manager can maintain statistics of route usage. The caching agent delivers the retrieved route to the routing agent, which passes the route to the switch or router.

FIG. 5B illustrates retrieval of a route from the route server. The routing agent receives a route request and passes the destination address, QoS profile, and optimization criteria to the caching agent. If the caching agent cannot find a suitable route in the local cache, the caching agent informs the routing agent of the failure. The routing agent then contacts the route server through the interconnection network (e.g., shared bus, LAN, or WAN), passing the destination address, QoS profile, and optimization criteria to the server. The route server obtains a suitable route, which it transmits back to the routing agent in the client. The routing agent informs the cache manager and caching agent of the new route so that the newly obtained route can be added to the cache. Finally, the routing agent delivers the route to the switch or router.

It will be appreciated by those skilled in this art that various modifications and variations can be made to the distributed architecture and protocols consistent with the present invention described herein without departing from the spirit and scope of the invention. Other embodiments of the invention will be apparent to those skilled in this art from consideration of the specification and practice of the invention disclosed herein. For example, FIG. 4 illustrates only an exemplary implementation of software modules, and many other implementations consistent with the present invention are possible. In the methodology discussed in connection with FIG. 4, clients observe partial caching and dynamically learn about the locality of interest based on network usage. However, several combinations of caching (full or partial at the clients and/or server) and cache learning (static and dynamic) are consistent with the present invention. For example, when destination addresses and QoS profiles are static, the cache manager does not use learning algorithms.

Similarly, if a client node stores routes to every possible destination of local interest for the QoS profiles of interest, the cache manager need no replace routes to free memory for storing newly learned routes. Instead, the client simply replaces the old entry with the newly learned entry. Additionally, handling of crankbacks may be simplified where the client node labels the route which has suffered the failure and either uses an alternate route from its own cache or requests the server for an alternative route. If a new route is obtained from the server, the client node simply updates the labeled route with the newly learned entry. The server, on the other hand, may trigger recomputation of the network corridor map, possibly in the background, in the event of a crankback failure and/or on a periodic basis. The route server may bundle updates for a whole network corridor map in one message to simplify the synchronization process. Therefore, it is intended that the specification and examples be considered exemplary only, with the true scope and spirit of the invention being indicated by the following claims.

We claim:

1. A method for selecting a route between a source node and a destination node wherein the route satisfies a QoS profile, wherein the source node stores in a route cache a plurality of pre-computed routes originating at the source node, and wherein the source node is connected to a route server, the method comprising:

searching the route cache for a route satisfying the QoS profile; and if no satisfying route is found in the route cache, obtaining a route from the server satisfying the QoS profile updating the contents of the route cache based on network usage, wherein updating includes adding the route computed at the server to the route cache wherein the step of updating further includes:

for each pre-computed route in the route cache, measuring time since the pre-computed route was added to the route cache to provide a stored time;

comparing the stored times to a predetermined route lifetime; and purging from the route cache the pre-computed routes whose stored time exceeds the route lifetime.

2. The method of claim 1 wherein the step of updating further includes:

If the route cache is full before the computed route is added, removing one of the pre-computed routes from the route cache.

3. The method of claim 1 wherein the step of updating further includes:

for each pre-computed route in the route cache, measuring a last accessed time since the pre-computed route was selected as the route between the source node and the destination node;

comparing the last accessed measured times;

if the route cache is full before the computed route is added, choosing one of the pro-computed routes to be removed from the route cache based on the comparison of last accessed measured times; and removing the chosen one of the pre-computed routes from the route cache.

4. The method of claim 1 wherein the step of updating further includes:

for each pre-computed route in the route cache, maintaining a count of the number of times a pre-computed route is selected as the route between the source and the destination node;

comparing the counts;

if the route cache is fall before the computed route is added, choosing one of the pre-computed routes to be removed from the route cache based on the comparison of counts; and removing the chosen one of the pre-computed routes from the route cache.

5. The method of claim 1, wherein the step of updating further includes:

for each pre-computed route in the route cache, measuring the time since the pre-computed route was selected as the route between the source node and the destination node;

for each pre-computed route in the route cache, maintaining a count of the number of times a pre-computed route is selected as the route between the source node and the destination node;

weighting the counts by the measured times;

comparing the weighted counts;

if the route cache is full before the computed route is added, choosing one of the pre-computed routs to be removed from the route cache based on the comparison of the weighted counts; and removing the chosen one of the pre-computed routes from the cache.

6. The method of claim 5 wherein the step of weighting the counts by the measured times includes the substep of calculating a holding priority during the kth time interval according to the equation $H_k = w^* H_{k-1} + (1-w) U_{k-1}$, where $U_{k-1}$ is the count during the (k−1)st interval, and w is a number such that $0 <= w <= 1$; and wherein the step of choosing one of the pre-computed routes to be removed includes the substep of during the time period p, choosing the one of the pre-computed routes with the lowest $H_p$.

7. The method of claim 1 wherein the step of updating further includes:

for each pre-computed route in the route cache, measuring time since the pre-computed route was added to the route cache;

choosing one of the pro-computed routes to be purged from the mute cache based on the measured time; and purging the chosen one of the pre-computed routes from the route cache.

8. The method of claim 1 wherein the step of updating further includes:

for each pre-computed route in the route cache, maintaining a count of the number of times a pre-computed route is selected as the route between the source node and the destination node;

updating the purged route based on a current state of the network; and adding the updated route to the route cache if the count before purging exceeds a threshold.

9. A packet switching network comprising:

a route server;

a source node connected to a route server;

a destination node;

a route cache connected to the source node, the route cache containing a plurality of pre-computed routes originating at the source node; and means for selecting a route between the source node and the destination node that satisfies a QoS profile, the means comprising:

means for searching the route cache for a route satisfying to the QoS profile;

means for obtaining a route from the server that satisfies the QoS profile if no satisfying route is found in the route cache;

means for updating the route cache based on network usage, wherein the means for updating includes means for adding lee route computed at the server to the route cache, wherein the means for updating further includes:

for each pre-computed route in the route cache, means for measuring time since the pre-computed route was added to the route cache;

means for comparing the measured times to a predetermined route lifetime; and means for purging from the route cache the pre-computed routes whose measured time exceeds the route lifetime.

10. The network of claim 9 wherein the means for updating further includes:

means for removing one of the pre-computed routes from the route cache if the route cache is full before the computed route is added, means for choosing one of the pre-computed routes to be removed from the route cache based on the comparison of counts if the route cache is full before the computed route is added; and means for removing the chosen one of the pre-computed routes from the route cache.

11. The network of claim 9 wherein the means for updating further includes:

means for measuring time since each pre-computed route was selected as the route between the source node and the destination node;

means for comparing the measured times;

means for choosing one of the pre-computed routes to be removed from the route cache based on the comparison of measured times if the route cache is fall before the computed route is added; and means for removing the chosen one of the pre-computed routes from the route cache.

12. The network of claim 9 wherein the means for updating further includes:

means for maintaining a count of the number of times each pre-computed route is selected as the route between the source node and the destination node;

means for comparing the counts;

means for choosing one of the pre-computed routes to be removed from the route cache based on the comparison of counts if the route cache is fall before the computed route is added; and means for removing the chosen one of the pre-computed routes from the route cache.

13. The network of claim 9 wherein the means for updating further includes:

means for measuring time since each pre-computed route was selected as the route between the source node and the destination node;

means for maintaining a count of the number of times each pre-computed route is selected as the route between the source node and the destination node;

means for weighting the counts by the measured times;

means for comparing the weighted counts;

means for choosing one of the pre-computed routes to be removed from the route cache based on the comparison of weighted counts if the route cache is full before the computed route is added; and means for removing the chosen one of the pre-computed routes from the route cache.

14. The network of claim 13 wherein the means for weighting tie counts by the measured times includes means for calculating a holding priority during he kth time interval according to the equation $H_k = w^* H_{k-1} + (1-w) U_{k-1}$, where $U_{k-1}$ is the count during the (k−1)st interval, and w is a number such that $0 <= w <= 1$;

and wherein the means for choosing one of the pre-computed routes to be removed includes means for choosing, during the time period p, the one of the pre-computed routes with the lowest $H_p$.

15. The network of claim 9 further comprising:

means for purging a pre-computed route from the route cache.

16. The network of claim 9 wherein the means for updating further includes:

for each pre-computed route in the route cache, means for measuring time since the pre-computed route was added to the route cache;

means for choosing one of the pre-computed routes to be purged from the route cache based on the measured time; and means for purging the chosen one of the pre-computed routes from the route cache.

17. The network of claim 9 wherein the means for updating further includes:

for each pre-computed route in the route cache, means maintaining a count of the number of times a pre-computed route is selected as the route between the source node and the destination node;

means for updating the purged route based on a current state of the network; and means for adding the updated route to the route cache if the count before purging exceeds a threshold.

18. A packet switching network comprising:

a plurality of route servers;

a plurality of client network nodes, each client node connected to a route server;

a route cache connected to each client node, the route cache containing a plurality of pre-computed routes originating at the client node;

a route cache connected to each route server containing a second plurality of pre-computed routes;

means for selecting a route between a first node and a second node that satisfies a QoS profile, the means comprising:

means for searching the client route cache for a route satisfying the QoS profile;

means for searching the server route cache for a route satisfying the QoS profile if no satisfying route is found in the client route cache; and means for computing a route at the server that satisfies the QoS profile if no satisfying route is found in the server route cache.

* * * * *